US008837430B2

(12) United States Patent
Chin et al.

(10) Patent No.: US 8,837,430 B2
(45) Date of Patent: Sep. 16, 2014

(54) METHOD AND APPARATUS FOR POWER CORRECTION IN UPLINK SYNCHRONIZATION DURING A TD-SCDMA HANDOVER

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/384,189

(22) PCT Filed: Mar. 31, 2010

(86) PCT No.: PCT/US2010/029520
§ 371 (c)(1),
(2), (4) Date: Jan. 13, 2012

(87) PCT Pub. No.: WO2011/059517
PCT Pub. Date: May 19, 2011

(65) Prior Publication Data
US 2012/0269166 A1  Oct. 25, 2012

Related U.S. Application Data

(60) Provisional application No. 61/260,710, filed on Nov. 12, 2009.

(51) Int. Cl.
*H04W 4/00* (2009.01)
*H04W 52/40* (2009.01)
*H04W 36/00* (2009.01)
*H04W 52/16* (2009.01)
*H04W 52/14* (2009.01)

(52) U.S. Cl.
CPC .............. *H04W 52/40* (2013.01); *H04W 52/16* (2013.01); *H04W 36/0055* (2013.01); *H04W 52/146* (2013.01); *H04W 36/0005* (2013.01)
USPC ....................................................... 370/331

(58) Field of Classification Search
None
See application file for complete search history.

(56) References Cited

U.S. PATENT DOCUMENTS 7,295,842 B2 * 11/2007 Yang et al. ................. 455/436
8,260,297 B2 * 9/2012 Jeong et al. ................ 455/436
(Continued)

FOREIGN PATENT DOCUMENTS

CN 1446009 A 10/2003
CN 1678115 A 10/2005
(Continued)

OTHER PUBLICATIONS

International Search Report and Written Opinion—PCT/US2010/029520, International Search Authority—European Patent Office—Aug. 13, 2010.

(Continued)

*Primary Examiner* — Mark Rinehart
*Assistant Examiner* — Maharishi Khirodhar
(74) *Attorney, Agent, or Firm* — Kristine U. Ekwueme

(57) ABSTRACT

A method and apparatus for adjusting and offsetting a power level of uplink transmissions from user equipment in a wireless communication system. In an aspect of the disclosure, a handoff from a source base station to a target base station includes the target base station determining a suitable power offset value and communicating this offset to the source base station. The source base station transmits a handover instruction including the offset to the user equipment (UE), and the UE transmits a synchronization code. The target base station then calculates a further power correction and transmits the correction with an acknowledgment of the synchronization code. The UE then sets the power for future transmissions based in part on the offset and correction values.

40 Claims, 5 Drawing Sheets

(56) References Cited

U.S. PATENT DOCUMENTS

| | | | |
|---|---|---|---|
| 2004/0258020 A1* | 12/2004 | Hayata | 370/331 |
| 2007/0072615 A1* | 3/2007 | Kim et al. | 455/436 |
| 2009/0047962 A1 | 2/2009 | Rao | |
| 2009/0274086 A1 | 11/2009 | Petrovic et al. | |

FOREIGN PATENT DOCUMENTS

| | | |
|---|---|---|
| CN | 1710991 A | 12/2005 |
| EP | 1871013 A2 | 12/2007 |
| WO | WO2007024851 | 3/2007 |
| WO | WO 2009023228 A1 * | 2/2009 |
| WO | WO2009023228 A1 | 2/2009 |

OTHER PUBLICATIONS

Taiwan Search Report—TW099110787—TIPO—Apr. 25, 2013.

* cited by examiner

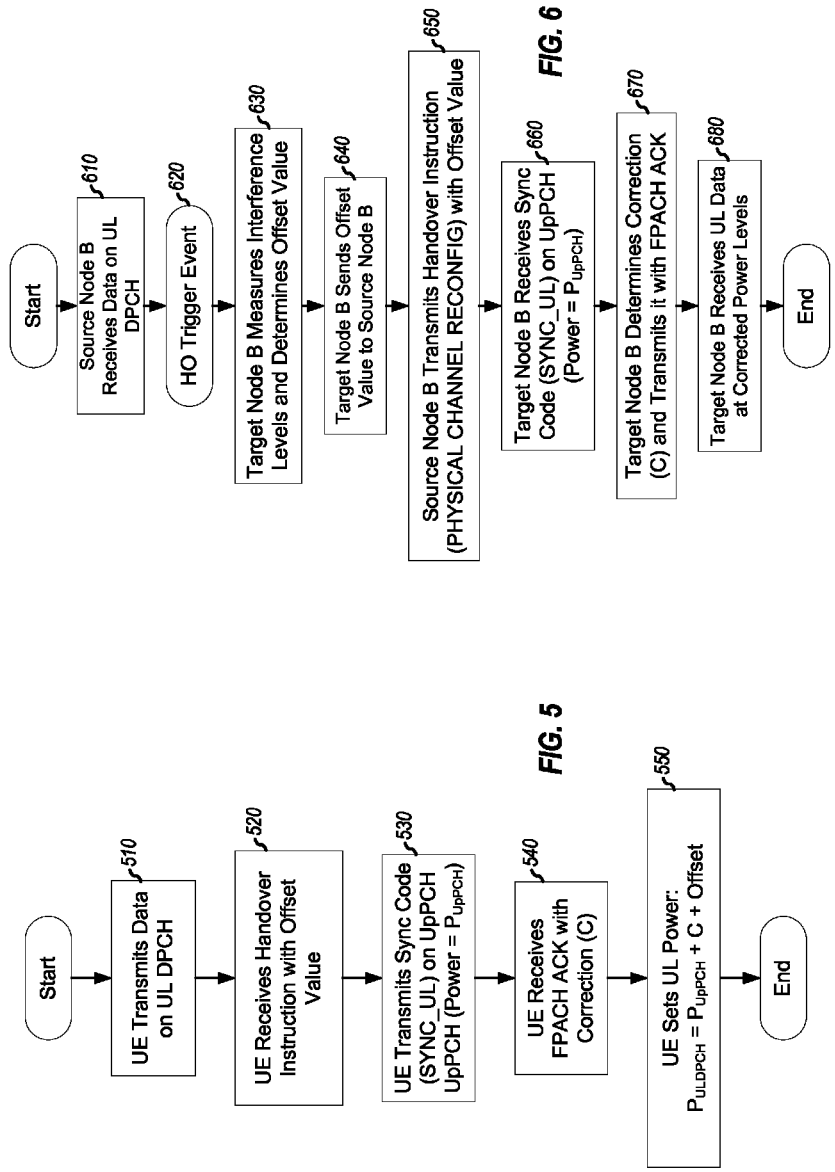

001
METHOD AND APPARATUS FOR POWER CORRECTION IN UPLINK SYNCHRONIZATION DURING A TD-SCDMA HANDOVER

CROSS-REFERENCE TO RELATED APPLICATION(S)

This application claims the benefit of U.S. Provisional Patent Application No. 61/260,710, entitled "SYSTEM AND METHOD FOR POWER CORRECTION IN UL SYNCHRONIZATION OF TD-SCDMA HANDOVER," filed on Nov. 12, 2009, which is expressly incorporated by reference herein in its entirety.

BACKGROUND

1. Field

Aspects of the present disclosure relate generally to wireless communication systems, and more particularly, to an uplink synchronization procedure and handover signaling in a cellular communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

Some aspects of the instant disclosure enable user equipment to obtain a closed-loop estimation for the initial transmit power to be used in a handover. Various aspects of the disclosure may improve reliability in handover and reduce power consumption.

In an aspect of the disclosure, a method of wireless communication includes receiving an indication from a source Node B to perform a handover to a target Node B, transmitting a synchronization code to the target Node B, and receiving an acknowledgment signal from the target Node B, the acknowledgment signal comprising information associated with adjustment of a transmit power for an uplink data channel after the handover.

In another aspect of the disclosure, a method of wireless communication includes receiving a synchronization signal from a user equipment (UE) on an uplink pilot channel, determining an adjustment of a transmit power for future transmissions to a target Node B relative to the transmission of the synchronization signal from the UE, and transmitting an acknowledgment message to the UE, the acknowledgment message comprising information associated with the adjustment of the transmit power.

In another aspect of the disclosure, an apparatus for wireless communication includes means for receiving an indication from a source Node B to perform a handover to a target Node B, means for transmitting a synchronization code to the target Node B, and means for receiving an acknowledgment signal from the target Node B, the acknowledgment signal comprising information associated with adjustment of a transmit power for an uplink data channel after the handover.

In another aspect of the disclosure, an apparatus for wireless communication includes at least one processor and a memory coupled to the at least one processor, wherein the at least one processor is configured to receive, at a target Node B, a synchronization signal from a UE on an uplink pilot channel corresponding to a handover from a source Node B to the target Node B, to determine an adjustment of a transmit power for future transmissions to a target Node B relative to the transmission of the synchronization signal from the UE, and to transmit an acknowledgment message to the UE, the acknowledgment message comprising information associated with the adjustment of the transmit power.

In another aspect of the disclosure, a computer program product includes a computer-readable medium having code for receiving an indication from a source Node B to perform a handover to a target Node B, transmitting a synchronization code to the target Node B, and receiving an acknowledgment signal from the target Node B, the acknowledgment signal comprising information associated with adjustment of a transmit power for an uplink data channel after the handover.

In another aspect of the disclosure, an apparatus for wireless communication includes at least one processor and a memory coupled to the at least one processor, wherein the at least one processor is configured to receive an indication from a source Node B to perform a handover to a target Node B, transmit a synchronization code to the target Node B, and receive an acknowledgment signal from the target Node B, the acknowledgment signal comprising information associated with adjustment of a transmit power for an uplink data channel after the handover.

BRIEF DESCRIPTION OF THE DRAWINGS

FIG. 5 is a flow chart conceptually illustrating a procedure for a UE according to an aspect of the disclosure.

FIG. 6 is a flow chart conceptually illustrating a procedure for a network according to an aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
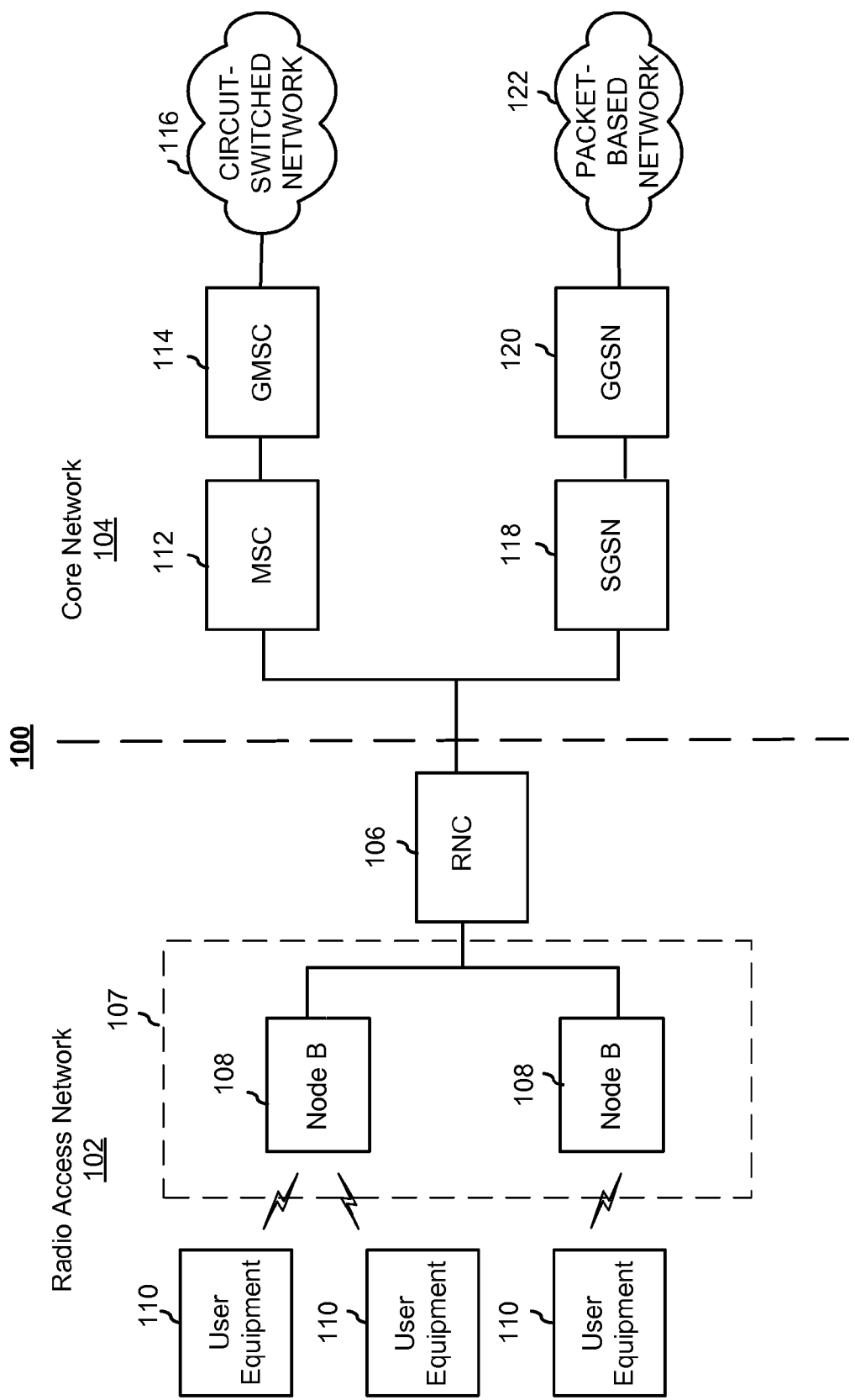
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides uplink and downlink transmissions into different time slots in the carrier.

Figure 2:
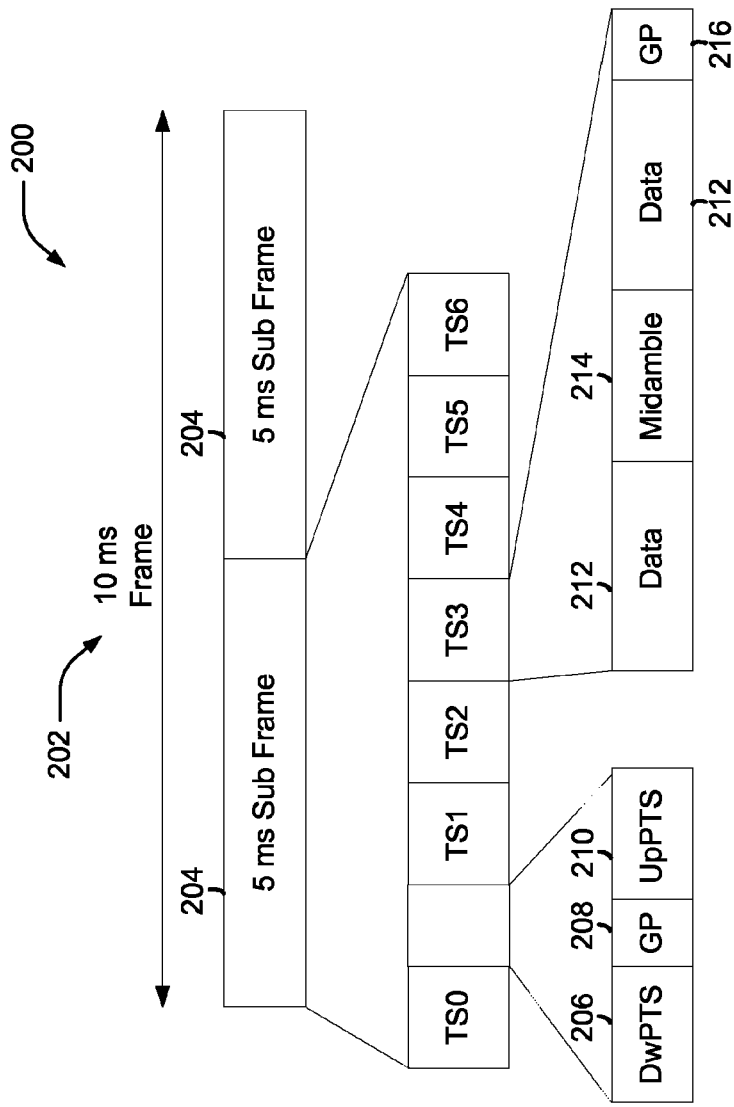
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 are located between TS0 and TS1. Each time slot, TS0-TS6, may allow data transmission multiplexed on a maximum of 16 code channels. Data transmission on a code channel includes two data portions 212 separated by a midamble 214 and followed by a guard period GP 216. The midamble 214 may be used for features, such as channel estimation, while the GP 216 may be used to avoid inter-burst interference.

Figure 3:
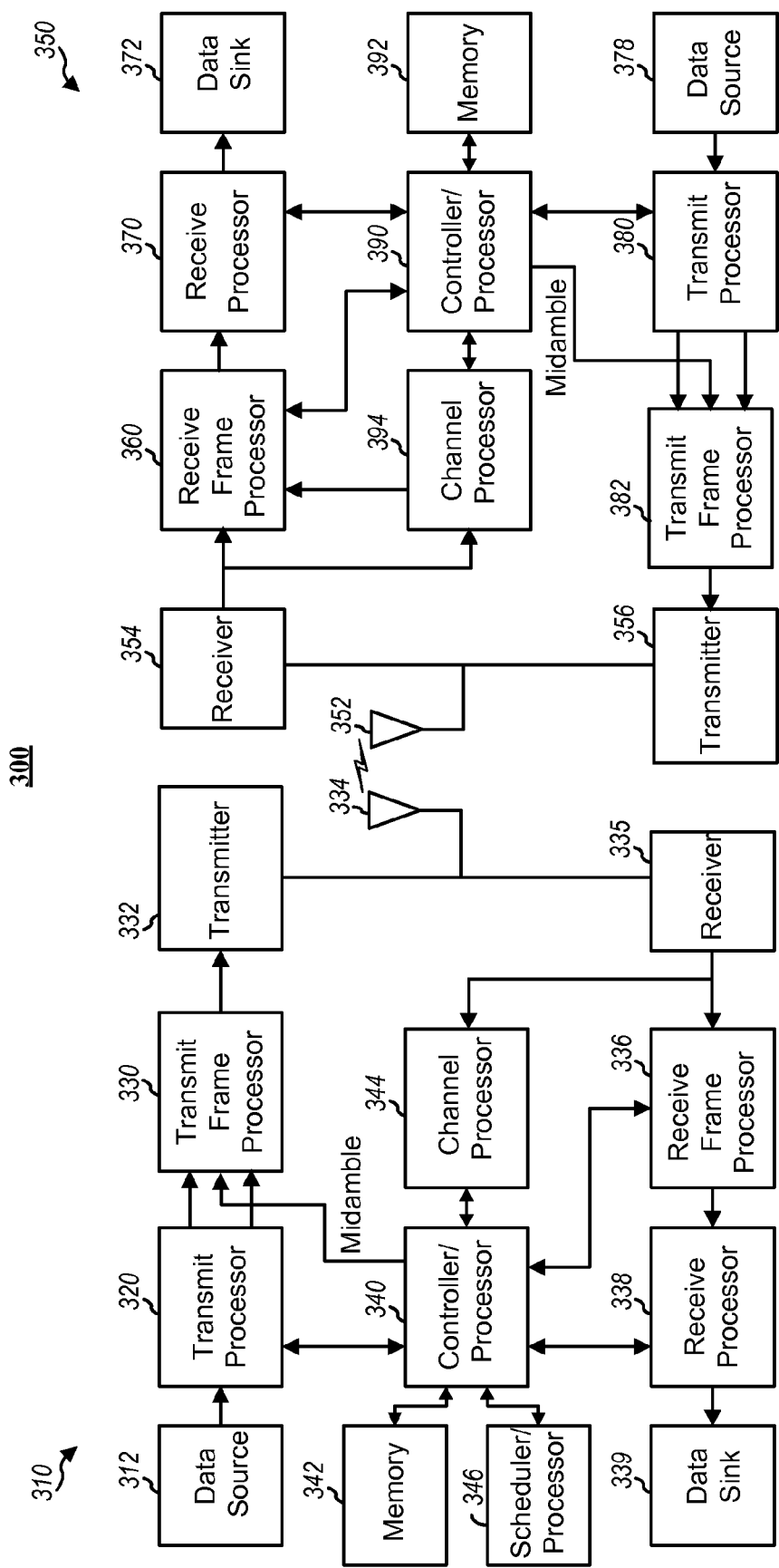
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded.

The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Those skilled in the art will recognize that in various TD-SCDMA systems, a handover from a first, "source" Node B o a second, "target" Node B may utilize a hard handover and/or a baton handover procedure. Another notable feature of TD- SCDMA systems, known to those of ordinary skill in the art, is uplink synchronization. That is, in TD-SCDMA systems, different UEs may synchronize with one another on the uplink (UL) such that signals transmitted from different UEs may arrive at the Node B at substantially the same time. The uplink pilot channel (UpPCH, transmitted in the UpPTS 210, see FIG. 2) may be utilized for this purpose.

That is, the UE may transmit an uplink synchronization code (SYNC_UL) to the network on the UpPCH. The Node B that receives the SYNC_UL code may measure its timing and send a timing correction command back to the UE, to request a correction of the timing of future UE transmissions by utilizing an ACK message on the fast physical access channel (FPACH). This procedure may be part of an initial random access procedure, or part of a handover procedure. An example of the FPACH ACK message is illustrated in Table 1.

TABLE 1

| Field | Length | Description |
| --- | --- | --- |
| Signature Reference Number | 3 (MSB) | Indicate SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level in PRACH |
| Reserved bits | 9 (LSB) | N/A |

In Table 1, the FPACH ACK message includes an information element (IE) denoted as "transmit power level command for RACH." This IE may be utilized to indicate a transmit power level to be utilized by the UE on the random access channel (RACH). This information is included in the ACK message for utilization during an initial random access, that is, when the UE is initiating a new connection, such as a call.

However, in a handover procedure, the field for the "transmit power level command for RACH" is generally not used, because once the UE receives the FPACH ACK message, the UE may immediately transmit on the dedicated physical channel (DPCH) in the target cell. That is, the UE might not transmit on the physical random access channel (PRACH) at all, so the suggested power level to use on that channel may go unused.

The UE may utilize the value of the "uplink pilot channel position" (UpPCHPOS) parameter to determine the initial timing for transmitting in the target cell, and may utilize an open-loop power measurement to estimate the initial UL power used on the UpPCH. The open-loop power estimation may be based on a DL measurement of the primary common control physical channel (P-CCPCH) to predict the UL propagation loss and UL transmit power, with the assumption that the DL and UL propagation losses are the same. Those skilled in the art will comprehend that this may not be very accurate. In addition, the Node B that receives the SYNC_UL code may not know the exact purpose of the code, that is, whether it is for a hard handover or an initial random access procedure.

Thus, in an aspect of the instant disclosure, the FPACH ACK message may be modified from the above example to carry information associated with the adjustment of the transmit power. For example, the FPACH ACK message may utilize a portion of the reserved bits in Table 1 to include a power correction IE, containing an adjustment relative to the power of the UpPCH, i.e., the SYNC_UL code. An example of a FPACH ACK message format including this IE is illustrated in Table 2.

TABLE 2

| Field | Length | Description |
| --- | --- | --- |
| Signature Reference Number | 3 (MSB) | Indicate SYNC_UL code |
| Relative Sub-Frame Number | 2 | Sub-Frame number preceding the ACK |
| Received starting position of the UpPCH (UpPCHPOS) | 11 | Used for timing correction |
| Transmit Power Level Command for RACH message | 7 | Used for power level in PRACH |
| C: Transmit Power Correction Command for UpPCH | 6 | Used for power correction in UpPCH (in dB) |
| Reserved bits | 3 (LSB) | N/A |

In the illustrated example, an IE indicating a power correction utilizes six of the nine reserved bits in the ACK message illustrated in Table 1. Here, the "transmit power correction command for UpPCH" field includes 6 bits, which, in one example, may provide power correction in a range of $2^5-1$ to $-2^5$ dB in UL transmission. However, one skilled in the art will comprehend that the range represented by the six bits may be different than $2^5-1$ to $-2^5$, and also that the Transmit Power Correction Command for UpPCH may include essentially any suitable bit length of greater or less than 6 bits. This power correction may be utilized to compensate for the propagation loss and interference level on UpPCH.

The correction command, which will hereafter be denoted as "C" (in dB), may be added to the most recent transmit power $P_{UpPCH}$ to obtain the next transmit power $P'_{UpPCH}$, as illustrated in Equation (1).

$$P'_{UpPCH}(dBm) = P_{UpPCH}(dBm) + C(dB) \quad (1)$$

The power correction information element C in the FPACH ACK message may be utilized during a handover process, or may be utilized in both a handover process and in an initial random access process, e.g., the initiation of a new call by the UE.

In another aspect of the disclosure, in addition to the information associated with the adjustment of the transmit power of the UpPCH, the UE may determine a suitable initial transmit power to be utilized for the UL DPCH in the target cell. That is, the DPCH in the target cell may have a power setting that is different from that of the UpPCH in the target cell.

To determine a suitable power setting for the UL DPCH, an additional IE denoted "power offset relative to UpPCH" may be included in a message at or near the beginning of the handover process. For example, the PHYSICAL CHANNEL RECONFIGURATION message, which instructs the UE to perform a handover, may include this power offset IE. Therefore, the UE may initialize its power level in transmitting on the UL DPCH in the target cell according to Equation (2).

$$P_{ULDPCH}(dBm) = P_{UpPCH}(dBm) + C + \text{Power\_Offset\_Relative\_To\_UpPCH}(dB) \quad (2)$$

To match with a dynamic channel environment, the target Node B may measure an interference level in the time slot of UpPCH ($I_{UpPCH}$) and an interference level in the time slot of UL DPCH ($I_{DPCH}$) for the UE to handover during a handover preparation procedure. Then, the desired SIR (signal to interference ratio) between these two channels, $SIR_{UpPCH}$ and $SIR_{DPCH}$, may be utilized to calculate the power offset, as shown in Equation (3).

$$\text{Power\_Offset\_Relative\_To\_UpPCH}(dB) = [SIR_{DPCH}(dB) + I_{DPCH}(dBm)] - [SIR_{UpPCH}(dB) + I_{UpPCH}(dBm)] \quad (3)$$

Furthermore, the network may add a suitable margin to the equation (3) to compensate for radio channel fluctuation or measurement error.

Assuming the UL propagation losses are substantially the same between UpPCH and DPCH, the equation (2) may provide a very good setting of the initial transmit power utilized in handover.

The target Node B may reply to the RNC in preparing the handover with the Power_Offset_Relative_To_UpPCH IE, and the RNC may compose the RRC signaling message being sent to the UE from the source Node B.

Figure 4:
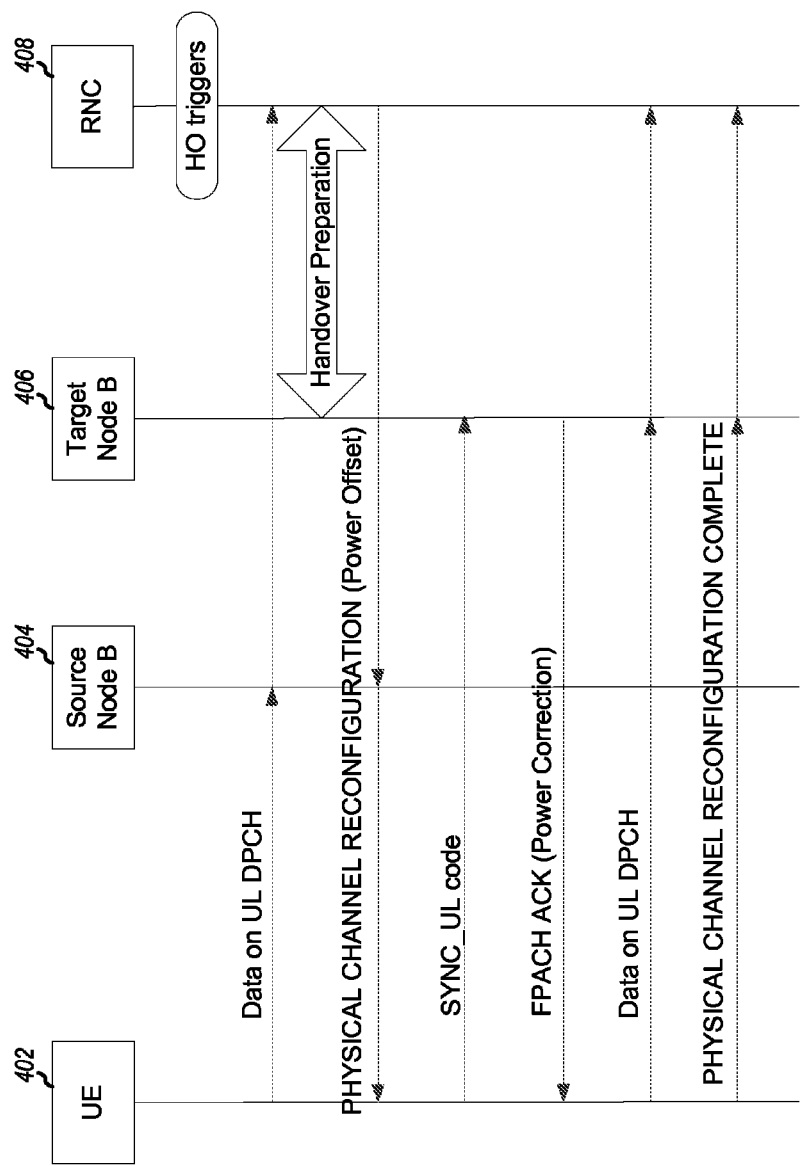
FIG. 4 is call flow diagram conceptually illustrating a procedure according to an aspect of the disclosure.

FIG. 4 is a call flow diagram illustrating a handover process according to an aspect of the instant disclosure. In addition, FIGS. 5-6 are flow charts illustrating a handover process from the aspect of a UE (FIG. 5) and from the aspect of the network (FIG. 6). In an aspect of the disclosure, the process illustrated in FIGS. 4-6 may be performed by the UE 110 and RNS 107 illustrated in FIG. 1. In a further aspect of the disclosure, the UE 110 may be the UE 350 illustrated in FIG. 3, and the Node Bs 108 in the RNS 107 may each be the Node B 310 illustrated in FIG. 3.

That is, in one configuration, the apparatus 350 for wireless communication includes means for transmitting and receiving over various channels with one or more Node Bs; means for calculating and correcting timing information associated with the transmitting and receiving; and means for processing signals received from the one or more Node Bs. In one aspect, the aforementioned means may be the processor(s) 360, 370, 394, 390, 382, and/or 380, configured to perform the functions recited by the aforementioned means. In another aspect, the aforementioned means may be a module or any apparatus configured to perform the functions recited by the aforementioned means.

Returning to FIGS. 4-6, according to an aspect of the disclosure, in block 510, the UE 402 may transmit data on the UL DPCH, and in block 610, the source Node B 404 (i.e., the Node B from which the handover will occur) may receive the data on the UL DPCH. Here, in block 630, the target Node B 406 (i.e., the Node B to which the handover will occur) may concurrently receive the data transmitted from the UE 402, and the target Node B may measure certain properties of the signal on the DPCH such as the signal strength and/or the interference level. Based on certain criteria, in block 620, the RNC 408 and/or the UE 402 may initiate a handover procedure.

In preparation for the handover procedure, based on the measured properties of the signal from the UE on the DPCH, in block 630 the target Node B 406 may determine the value of the information element "Power_Offset_Relative_To_UpPCH," corresponding to an adjustment of a power level of the signal transmitted by the UE 402 on the UpPCH. In block 640, the target Node B 406 may send this power offset value to the RNC 408, which then may send the value to the source Node B 404. In block 650, the source Node B 404 includes this power offset information element in the PHYSICAL CHANNEL RECONFIGURATION message, which, among other things, may concurrently inform the UE 402 that a handover from the source Node B 404 to the target Node B 406 is to take place. In block 520, the UE 402 receives the PHYSICAL CHANNEL RECONFIGURATION message instructing it to perform a handover to the target Node B 406, the message including the offset value.

In preparation for the handover to the target Node B 406, as discussed above, in block 530 the UE 402 may send the SYNC_UL code to the target Node B 406 on the UpPCH. Based on characteristics of the signal from the UE 402, such as a signal power and/or an interference level, in block 660, upon receiving the SYNC_UL code, the target Node B 406 may determine the value of the power correction IE "C," and thereby respond to the UE 402 in block 670 with the FPACH ACK message, including the power correction IE C, as discussed above.

In block 540, the UE may receive the FPACH ACK message from the target Node B 406, including information about the handover and the power correction IE C. In block 550, the UE 402 may determine an initial uplink transmission power for communication with the target Node B 406 corresponding to the previous power used for $P_{UpPCH}$, the Power_Offset_Relative_To_UpPCH information element, and the power correction information element C, as described above in Equation (2). Finally, in block 680, the target Node B 406 may receive data on the UL DPCH at a corrected power level.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving, at a receiver of a user equipment (UE), an indication from a source Node B to perform a handover to a target Node B;
   transmitting, from a transmitter of the UE, a synchronization code to the target Node B based at least in part on receiving the indication from the source Node B to perform the handover to the target Node B; and
   receiving, at the receiver of the UE, an acknowledgment signal from the target Node B, the acknowledgment signal comprising information associated with adjustment of a transmit power for an uplink data channel after the handover, wherein the information associated with adjustment of the transmit power comprises a power correction value to change the transmit power of the UE relative to that of a previous UE transmission.

2. The method of claim 1, wherein the uplink data channel comprises a dedicated physical channel.

3. The method of claim 1, wherein the source Node B and the target Node B are part of a Time Division-Synchronous Code Division Multiple Access (TD-SCDMA) network.

4. The method of claim 1, wherein the information associated with adjustment of the transmit power comprises a power correction information element including the power correction value.

5. The method of claim 1, wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel.

6. The method of claim 5, wherein the power offset information element corresponds to a difference in an interference level of respective UE transmissions on the uplink pilot channel and the uplink dedicated physical channel.

7. The method of claim 1, further comprising setting the UE transmit power, for transmitting to the target Node B, to a new transmit power value based on the power correction value.

8. A method of wireless communication, comprising:
   receiving, at a target Node B, a synchronization signal from a UE on an uplink pilot channel in response to a command for the UE to handover from a source Node B to the target Node B;
   determining an adjustment of a transmit power for future transmissions to a target Node B relative to the transmission of the synchronization signal from the UE; and
   transmitting an acknowledgment message to the UE, the acknowledgment message comprising information associated with the adjustment of the transmit power, wherein the information associated with adjustment of the transmit power comprises a power correction value to change the transmit power of the UE relative to that of a previous UE transmission.

9. The method of claim 8, wherein the source Node B and the target Node B are part of a Time Division-Synchronous Code Division Multiple Access (TD-SCDMA) network.

10. The method of claim 8, wherein the information associated with adjustment of the transmit power comprises a power correction information element including the power correction value.

11. The method of claim 8, further comprising:
   determining a power offset for a future transmission on an uplink dedicated physical channel relative to a power of a previous UE transmission on an uplink pilot channel; and
   transmitting to the UE a power offset information element corresponding to the determined power offset.

12. The method of claim 11, wherein the power offset information element corresponds to a difference in an interference level of respective UE transmissions on the uplink pilot channel and the uplink dedicated physical channel.

13. An apparatus for wireless communication, comprising:
   means for receiving an indication from a source Node B to perform a handover to a target Node B;
   means for transmitting a synchronization code to the target Node B based at least in part on receiving the indication from the source Node B to perform the handover to the target Node B; and
   means for receiving an acknowledgment signal from the target Node B, the acknowledgment signal comprising information associated with adjustment of a transmit power for an uplink data channel after the handover, wherein the information associated with adjustment of the transmit power comprises a power correction value to change the transmit power of the UE relative to that of a previous UE transmission.

14. The apparatus of claim 13, wherein the uplink data channel comprises a dedicated physical channel.

15. The apparatus of claim 13, wherein the source Node B and the target Node B are part of a Time Division-Synchronous Code Division Multiple Access (TD-SCDMA) network.

16. The apparatus of claim 13, wherein the information associated with adjustment of a transmit power comprises a power correction information element including the power correction value.

17. The apparatus of claim 13, wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel.

18. The apparatus of claim 17, wherein the power offset information element corresponds to a difference in an interference level of respective UE transmissions on the uplink pilot channel and the uplink dedicated physical channel.

19. The apparatus of claim 13, further comprising means for setting the UE transmit power, for transmitting to the target Node B, to a new transmit power based on the power correction value.

20. An apparatus for wireless communication, comprising:
at least one processor; and
a memory coupled to the at least one processor,
wherein the at least one processor is configured to:
receive, at a target Node B, a synchronization signal from a UE on an uplink pilot channel in response to a command for the UE to handover from a source Node B to the target Node B;
determine an adjustment of a transmit power for future transmissions to a target Node B relative to the transmission of the synchronization signal from the UE; and
transmit an acknowledgment message to the UE, the acknowledgment message comprising information associated with the adjustment of the transmit power, wherein the information associated with adjustment of the transmit power comprises a power correction value to change the transmit power of the UE relative to that of a previous UE transmission.

21. The apparatus of claim 20, wherein the source Node B and the target Node B are part of a Time Division-Synchronous Code Division Multiple Access (TD-SCDMA) network.

22. The apparatus of claim 20, wherein the information associated with adjustment of the transmit power comprises a power correction information element including the power correction value.

23. The apparatus of claim 20, wherein the at least one processor is further configured to:
determine a power offset for a future transmission on an uplink dedicated physical channel relative to a power of a previous UE transmission on an uplink pilot channel; and
transmit to the UE a power offset information element corresponding to the determined power offset.

24. The apparatus of claim 23, wherein the power offset information element corresponds to a difference in an interference level of respective UE transmissions on the uplink pilot channel and the uplink dedicated physical channel.

25. A computer program product for a user equipment (UE), comprising:
a non-transitory computer-readable medium comprising code executable by the UE for:
receiving an indication from a source Node B to perform a handover to a target Node B;
transmitting a synchronization code to the target Node B based at least in part on receiving the indication from the source Node B to perform the handover to the target Node B; and
receiving an acknowledgment signal from the target Node B, the acknowledgment signal comprising information associated with adjustment of a transmit power for an uplink data channel after the handover, wherein the information associated with adjustment of the transmit power comprises a power correction value to change the transmit power of the UE relative to that of a previous UE transmission.

26. The computer program product of claim 25, wherein the uplink data channel comprises a dedicated physical channel.

27. The computer program product of claim 26, wherein the source Node B and the target Node B are part of a Time Division-Synchronous Code Division Multiple Access (TD-SCDMA) network.

28. The computer program product of claim 26, wherein the information associated with adjustment of the transmit power comprises a power correction information element including the power correction value.

29. The computer program product of claim 26, wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel.

30. The computer program product of claim 29, wherein the power offset information element corresponds to a difference in an interference level of respective UE transmissions on the uplink pilot channel and the uplink dedicated physical channel.

31. The computer program product of claim 25, further comprising code for setting the UE transmit power, for transmitting to the target Node B, to a new transmit power based on the power correction value.

32. A user equipment (UE) apparatus for wireless communication, comprising:
at least one processor; and
a memory coupled to the at least one processor,
wherein the at least one processor is configured to:
receive an indication from a source Node B to perform a handover to a target Node B;
transmit a synchronization code to the target Node B based at least in part on receiving the indication from the source Node B to perform the handover to the target Node B; and
receive an acknowledgment signal from the target Node B, the acknowledgment signal comprising information associated with adjustment of a transmit power for an uplink data channel after the handover, wherein the information associated with adjustment of the transmit power comprises a power correction value to change the transmit power of the UE relative to that of a previous UE transmission.

33. The apparatus of claim 32, wherein the uplink data channel comprises a dedicated physical channel.

34. The apparatus of claim 32, wherein the source Node B and the target Node B are part of a Time Division-Synchronous Code Division Multiple Access (TD-SCDMA) network.

35. The apparatus of claim 32, wherein the information associated with adjustment of a transmit power comprises a power correction information element including the power correction value.

36. The apparatus of claim 32, wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel.

37. The apparatus of claim 36, wherein the power offset information element corresponds to a difference in an interference level of respective UE transmissions on the uplink pilot channel and the uplink dedicated physical channel.

38. The apparatus of claim 32, wherein the at least one processor is further configured to set the UE transmit power, for transmitting to the target Node B, to a new transmit power based on the power correction value.

39. A method of wireless communication, comprising:
   receiving an indication from a source Node B to perform a handover to a target Node B;
   transmitting a synchronization code to the target Node B; and
   receiving an acknowledgment signal from the target Node B, the acknowledgment signal comprising information associated with adjustment of a transmit power for an uplink data channel after the handover;
   wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel; and
   wherein the power offset information element corresponds to a difference in an interference level of respective UE transmissions on the uplink pilot channel and the uplink dedicated physical channel.

40. An apparatus for wireless communication, comprising:
   at least one processor; and
   a memory coupled to the at least one processor;
   wherein the at least one processor is configured to:
      receive an indication from a source Node B to perform a handover to a target Node B;
      transmit a synchronization code to the target Node B; and
      receive an acknowledgment signal from the target Node B, the acknowledgment signal comprising information associated with adjustment of a transmit power for an uplink data channel after the handover;
   wherein the indication from the source Node B to perform the handover comprises a power offset information element adapted to indicate an adjustment of a power to be utilized on a future transmission on an uplink dedicated physical channel relative to a power of a previous UE transmission on an uplink pilot channel; and
   wherein the power offset information element corresponds to a difference in an interference level of respective UE transmissions on the uplink pilot channel and the uplink dedicated physical channel.

\* \* \* \* \*